(12) United States Patent
Minato

(10) Patent No.: US 11,758,112 B2
(45) Date of Patent: Sep. 12, 2023

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Yoshihiko Minato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 17/487,171

(22) Filed: Sep. 28, 2021

(65) Prior Publication Data

US 2022/0109823 A1 Apr. 7, 2022

(30) Foreign Application Priority Data

Oct. 5, 2020 (JP) ................................. 2020-168524

(51) Int. Cl.
| | |
|---|---|
| *H04N 13/282* | (2018.01) |
| *G06F 16/78* | (2019.01) |
| *H04N 13/279* | (2018.01) |
| *H04N 23/695* | (2023.01) |

(52) U.S. Cl.
CPC ....... *H04N 13/282* (2018.05); *G06F 16/7867* (2019.01); *H04N 13/279* (2018.05); *H04N 23/695* (2023.01)

(58) Field of Classification Search
None
See application file for complete search history.

(56) References Cited

U.S. PATENT DOCUMENTS

| | | | | |
|---|---|---|---|---|
| 2007/0162667 | A1* | 7/2007 | Kim | H04N 5/76 |
| | | | | 710/62 |
| 2013/0016097 | A1* | 1/2013 | Coene | G06T 15/205 |
| | | | | 345/419 |
| 2017/0278546 | A1* | 9/2017 | Xiao | H04N 5/911 |
| 2018/0220125 | A1* | 8/2018 | Tamir | G06T 19/003 |
| 2018/0242015 | A1* | 8/2018 | Katsavounidis | H04L 65/80 |
| 2019/0022492 | A1* | 1/2019 | Takahashi | G06F 17/18 |
| 2020/0126299 | A1* | 4/2020 | Bosch | G06T 13/20 |
| 2021/0398341 | A1* | 12/2021 | Minato | G06T 19/003 |
| 2022/0292777 | A1* | 9/2022 | Nadro | G06F 30/23 |
| 2022/0412741 | A1* | 12/2022 | Wakabayashi | G01C 21/3415 |

FOREIGN PATENT DOCUMENTS

JP 2012-060280 A 3/2012

* cited by examiner

*Primary Examiner* — Talha M Nawaz
(74) *Attorney, Agent, or Firm* — Carter, DeLuca & Farrell LLP

(57) ABSTRACT

To make it possible to easily perform setting of virtual viewpoint information relating to playback of a virtual viewpoint image. A key frame is generated in which parameters representing a position of a virtual viewpoint and an orientation of the virtual viewpoint are associated with time in a period during which image capturing is performed by a plurality of imaging devices. Then, a playback direction of a plurality of key frames is determined. Then, based on the plurality of key frames and the playback direction, virtual viewpoint information representing transition of the virtual viewpoint is generated.

10 Claims, 15 Drawing Sheets

FIG.5

| VIDEO CLIP DESIRED TO BE CREATED |
|---|
| No.1 20:05:46:58 |
| No.2 20:05:48:08 |
| No.3 20:05:53:15 |
| No.4 20:05:57:10 |

501

| AT THE TIME OF SETTING OF SECOND KF |
|---|
| No.1 20:05:46:58 |
| No.2 20:05:57:10 |

502

| AT THE TIME OF SETTING OF THIRD KF |
|---|
| No.1 20:05:46:58 |
| No.2 20:05:53:15 |
| No.3 20:05:55:16 |

503

| AT THE TIME OF SETTING OF FOURTH KF |
|---|
| No.1 20:05:46:58 |
| No.2 20:05:48:08 |
| No.3 20:05:53:15 |
| No.4 20:05:57:10 |

| Key order | Play x Time Code — 901 | | |
|---|---|---|---|
| ▲ up ▼ down | Key No. hh:mm:ss:ff | Play dir. | Camera Position |
| ▲ ▼ | No.1 20:05:46:58 | Forward | X=1.0m Y=1.0m Z=1.0m Pan=0 Tilt=0 Zoom=6mm |

FIG. 9B

| Key order | Play x Time Code | | |
|---|---|---|---|
| | Time Code | | |
| | Key Frame | | |
| ▲ up ▼ down | Play x Time Code | Play dir. | Camera Position |
| ▲ ▼ | No.1 20:05:46:58 | Forward | X=1.0m Y=1.0m Z=1.0m Pan=0 Tilt=0 Zoom=6mm |

| Key order | Play x Time Code | | |
|---|---|---|---|
| ▲ up ▼ down | Key No. hh:mm:ss:ff | Play dir. | Camera Position |
| ▲ ▼ | No.1 20:05:46:58 | Forward  | X=1.0m Y=1.0m Z=1.0m Pan=0 Tilt=0 Zoom=6mm |

▲ Forward
▼ Reverse

FIG.11

| Key order | Play x Time Code | | |
|---|---|---|---|
| ▲ up ▼ down | Key No. | hh:mm:ss:ff | Play dir. | Camera Position |

| | | | |
|---|---|---|---|
| ▲▼ | No.1 | 20:05:46:58 | Forward | X=1.0m Y=1.0m Z=1.0m Pan=0 Tilt=0 Zoom=6mm |
| ▲▼ | No.2 | 20:05:48:08 | Forward | Pan=0 Tilt=0 Zoom=6mm |
| ▲▼ | No.3 | 20:05:53:15 | Forward | Pan=0 Tilt=0 Zoom=6mm |
| ▲▼ | No.4 | 20:05:57:10 | Forward | X=7.0m Y=1.0m Z=1.0m Pan=0 Tilt=0 Zoom=6mm |
| ▲▼ | No.5 | 20:05:55:16 | Reverse | X=6.0m Y=1.0m Z=1.0m Pan=0 Tilt=0 Zoom=6mm |
| ▲▼ | No.6 | 20:05:50:20 | Reverse | X=4.0m Y=1.0m Z=1.0m Pan=0 Tilt=0 Zoom=6mm |
| ▲▼ | No.7 | 20:05:47:23 | Reverse | X=2.0m Y=1.0m Z=1.0m Pan=0 Tilt=0 Zoom=6mm |

1001 — 1100 / 1110

Edit Area
Current Edit Area
▲ Forward Play
▼ Reverse Play

| Key order ▲ up ▼ down | Key No. hh:mm:ss:ff | Play dir. | Camera Position |
|---|---|---|---|
| ◀ ▶ | No.1 20:05:46:58 | Forward | X=1.0m Y=1.0m Z=1.0m Pan=0 Tilt=0 Zoom=6mm |
| ◀ ▶ | No.2 20:05:48:08 | Forward | X=3.0m Y=1.0m Z=1.0m Pan=0 Tilt=0 Zoom=6mm |
| ◀ ▶ | No.3 20:05:53:15 | Forward | X=4.0m Y=1.0m Z=1.0m Pan=0 Tilt=0 Zoom=6mm |
| ◀ ▶ | No.4 20:05:53:15 | Forward | X=5.0m Y=1.0m Z=1.0m Pan=0 Tilt=0 Zoom=6mm |
| ◀ ▶ | No.5 20:05:53:15 | Forward | X=6.0m Y=1.0m Z=1.0m Pan=0 Tilt=0 Zoom=6mm |
| ◀ ▶ | No.6 20:05:57:10 | Forward | X=7.0m Y=1.0m Z=1.0m Pan=0 Tilt=0 Zoom=6mm |
| ◀ ▶ | No.7 20:05:55:16 | Reverse | X=6.0m Y=1.0m Z=1.0m Pan=0 Tilt=0 Zoom=6mm |
| ◀ ▶ | No.8 20:05:50:20 | Reverse | X=4.0m Y=1.0m Z=1.0m Pan=0 Tilt=0 Zoom=6mm |
| ◀ ▶ | No.9 20:05:47:23 | Reverse | X=2.0m Y=1.0m Z=1.0m Pan=0 Tilt=0 Zoom=6mm |

Play × Time Code

FIG.12

| Key order ▲ up ▼ down | Key No. hh:mm:ss:ff | play dir. | Camera Position |
|---|---|---|---|
| ◀▶ | No.1 20:05:46:58 | Forward | X=1.0m Y=1.0m Z=1.0m Pan=0 Tilt=0 Zoom=6mm |
| ◀▶ | No.2 20:05:48:08 | Forward | X=3.0m Y=1.0m Z=1.0m Pan=0 Tilt=0 Zoom=6mm |
| ◀▶ | No.3 20:05:53:15 | Forward | X=4.0m Y=1.0m Z=1.0m Pan=0 Tilt=0 Zoom=6mm |
| ◀▶ | No.4 20:05:53:15 | Forward | X=5.0m Y=1.0m Z=1.0m Pan=0 Tilt=0 Zoom=6mm |
| ◀▶ | No.5 20:05:53:15 | Forward | X=6.0m Y=1.0m Z=1.0m Pan=0 Tilt=0 Zoom=6mm |
| ◀▶ | No.6 20:05:57:10 | Forward | X=7.0m Y=1.0m Z=1.0m Pan=0 Tilt=0 Zoom=6mm |
| ◀▶ | No.7 20:05:55:16 | Reverse | X=6.0m Y=1.0m Z=1.0m Pan=0 Tilt=0 Zoom=6mm |
| ◀▶ | No.8 20:05:50:20 | Reverse | X=4.0m Y=1.0m Z=1.0m Pan=0 Tilt=0 Zoom=6mm |
| ◀▶ | No.9 20:05:47:23 | Reverse | X=2.0m Y=1.0m Z=1.0m Pan=0 Tilt=0 Zoom=6mm |
| ◀▶ | No.10 20:05:47:23 | Reverse | X=3.0m Y=1.0m Z=1.0m Pan=0 Tilt=0 Zoom=6mm |

FIG.13

| Key order | Time Code | | | |
|---|---|---|---|---|
| ▲ up ▼ down | Key No. hh:mm:ss:ff | Play dir. | | Camera Position |
| ◀ ▶ | No.1 20:05:46:50 | - | | X=1.0m Y=1.0m Z=1.0m Pan=0 Tilt=0 Zoom=6mm |
| ◀ ▶ | No.2 20:05:46:58 | - | | X=1.0m Y=1.0m Z=5.0m Pan=0 Tilt=0 Zoom=6mm |
| ◀ ▶ | No.3 20:05:47:23 | - | | X=2.0m Y=1.0m Z=1.0m Pan=0 Tilt=0 Zoom=6mm |
| ◀ ▶ | No.4 20:05:48:08 | - | | X=3.0m Y=1.0m Z=5.0m Pan=0 Tilt=0 Zoom=6mm |
| ◀ ▶ | No.5 20:05:48:18 | - | | X=3.0m Y=1.0m Z=1.0m Pan=0 Tilt=0 Zoom=6mm |
| ◀ ▶ | No.6 20:05:50:20 | - | | X=4.0m Y=1.0m Z=1.0m Pan=0 Tilt=0 Zoom=6mm |
| ◀ ▶ | No.7 20:05:53:15 | - | | X=5.0m Y=1.0m Z=1.0m Pan=0 Tilt=0 Zoom=6mm |
| ◀ ▶ | No.8 20:05:55:16 | - | | X=6.0m Y=1.0m Z=1.0m Pan=0 Tilt=0 Zoom=6mm |
| ◀ ▶ | No.9 20:05:57:10 | - | | X=7.0m Y=1.0m Z=1.0m Pan=0 Tilt=0 Zoom=6mm |
| ◀ ▶ | No.10 20:05:58:10 | - | | X=7.0m Y=1.0m Z=5.0m Pan=0 Tilt=0 Zoom=6mm |

FIG.14

Key order | Play x Time Code

| | Key No.<br>hh:mm:ss:ff | Play dir. | Camera Position |
|---|---|---|---|
| ▲ up<br>▼ down | | | |
| ◀ ▶ | No.1<br>20:05:46:50 | Forward | X=1.0m Y=1.0m Z=1.0m Pan=0 Tilt=0 Zoom=6mm |
| ◀ ▶ | No.2<br>20:05:48:18 | Forward | X=3.0m Y=1.0m Z=1.0m Pan=0 Tilt=0 Zoom=6mm |
| ◀ ▶ | No.3<br>20:05:53:15 | Forward | X=5.0m Y=1.0m Z=1.0m Pan=0 Tilt=0 Zoom=6mm |
| ◀ ▶ | No.4<br>20:05:57:10 | Forward | X=7.0m Y=1.0m Z=1.0m Pan=0 Tilt=0 Zoom=6mm |
| ◀ ▶ | No.5<br>20:05:55:16 | Reverse | X=6.0m Y=1.0m Z=1.0m Pan=0 Tilt=0 Zoom=6mm |
| ◀ ▶ | No.6<br>20:05:50:20 | Reverse | X=4.0m Y=1.0m Z=1.0m Pan=0 Tilt=0 Zoom=6mm |
| ◀ ▶ | No.7<br>20:05:47:23 | Reverse | X=2.0m Y=1.0m Z=1.0m Pan=0 Tilt=0 Zoom=6mm |
| ◀ ▶ | No.8<br>20:05:46:58 | Forward | X=1.0m Y=1.0m Z=5.0m Pan=0 Tilt=0 Zoom=6mm |
| ◀ ▶ | No.9<br>20:05:48:08 | Forward | X=3.0m Y=1.0m Z=5.0m Pan=0 Tilt=0 Zoom=6mm |
| ◀ ▶ | No.10<br>20:05:58:10 | Forward | X=7.0m Y=1.0m Z=5.0m Pan=0 Tilt=0 Zoom=6mm |

FIG.15

INFORMATION PROCESSING APPARATUS, CONTROL METHOD, AND STORAGE MEDIUM

BACKGROUND

Field

The present disclosure relates to a technique to create and edit a virtual viewpoint image and camera path information on CG (Computer Graphics) animation.

Description of the Related Art

Recently, a technique has been attracting attention, which performs synchronous image capturing at multiple viewpoints by installing a plurality of imaging devices at different positions and generates a virtual viewpoint image using a multi-viewpoint image obtained by the image capturing. With the technique to generate a virtual viewpoint image from a multi-viewpoint image, it is possible to give a high feeling of being at a live performance to a user compared to a normal image. For example, in a case of a game of rugby, it is also possible to obtain an image that connects a scene obtained by capturing players carrying a ball toward the goal from a bird's eye viewpoint and a scene obtained by capturing a try from a viewpoint of observer of a specific player (for example, a scene from the line-of-sight of the fullback, in which a player passes by on the side of an opponent player). Further, it is also possible to play back an image in a reverse direction (reverse playback) after playing back the image from the bird's eye viewpoint (forward playback), and following this, play back the image from the viewpoint of observer (forward playback). Due to this, it is made possible to provide an easy-to-see image and an easy-to-understand commentary to a viewer, which do not exist in the past.

In a case where a virtual viewpoint image is generated, it is necessary to set virtual viewpoint information representing transition of the viewpoint (virtual viewpoint) virtually arranged within a three-dimensional space. As a creation method of virtual viewpoint information in a case where a virtual viewpoint image including switching of scenes as described above is obtained, for example, there is a key frame method. The key frame method is a method of obtaining camera path information by setting a plurality of reference frames (called "key frames") with which an arbitrary virtual viewpoint is associated and performing interpolation between the plurality of set key frames. In this key frame method, the set key frame and the virtual viewpoint are associated with each other using a time code so that it is possible to specify a correspondence relationship therebetween. In this regard, Japanese Patent Laid-Open No. 2012-060280 has disclosed a technique to advance CG animation to be rendered real time without a sense of incongruity in synchronization with the image material adopting time codes. However, the technique of Japanese Patent Laid-Open No. 2012-060280 does not suppose a case where CG animation is reversed on the way of advancement. Because of this, it is difficult to set virtual viewpoint information for generating a virtual viewpoint image that combines forward playback and reverse playback of the same scene as described above. As described above, there is a possibility that it is difficult to set virtual viewpoint information depending on the playback method of a virtual viewpoint image.

The information processing apparatus according to the present disclosure is an information processing apparatus including: a key frame generation unit configured to generate a key frame in which parameters representing a position of a virtual viewpoint and a direction from the virtual viewpoint are associated with time in a period during which image capturing is performed by a plurality of imaging devices, the virtual viewpoint being determined based on a user operation for designating the virtual viewpoint relating to a virtual viewpoint image generated based on a plurality of captured images obtained by image capturing performed by the plurality of imaging devices; a determination unit configured to determine a playback direction of a plurality of key frames generated by the key frame generation unit; and an information generation unit configured to generate virtual viewpoint information representing transition of the virtual viewpoint based on a plurality of key frames generated by the key frame generation unit and a playback direction determined by the determination unit.

Further features of the present disclosure will become apparent from the following description of exemplary embodiments with reference to the attached drawings.

BRIEF DESCRIPTION OF THE DRAWINGS

FIG. 5 is a diagram showing a process in which a key frame list is completed;

FIG. 9A to FIG. 9C are each a diagram showing a GUI for listing key frames;

FIG. 11 is a diagram showing a GUI for listing key frames;

FIG. 12 is a diagram showing a GUI for listing key frames;

FIG. 13 is a diagram showing a GUI for listing key frames;

FIG. 14 is a diagram showing a GUI for listing key frames; and

FIG. 15 is a diagram showing a GUI for listing key frames.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

First, an outline of a virtual viewpoint image is explained briefly. The virtual viewpoint image is an image that represents an appearance from a virtual camera viewpoint (virtual viewpoint) different from a real camera viewpoint and also called a free-viewpoint image. The virtual viewpoint is set by a method, such as a method in which a user directly designates the virtual viewpoint by operating a controller and a method in which a user selects the virtual viewpoint from among, for example, a plurality of virtual viewpoint candidates that are set in advance. The virtual viewpoint image includes both a moving image and a still image and in the following embodiment, explanation is given by premising a moving image and a virtual viewpoint image by a moving image is represented as a "virtual viewpoint image".

<About System Configuration>

Figure 1:
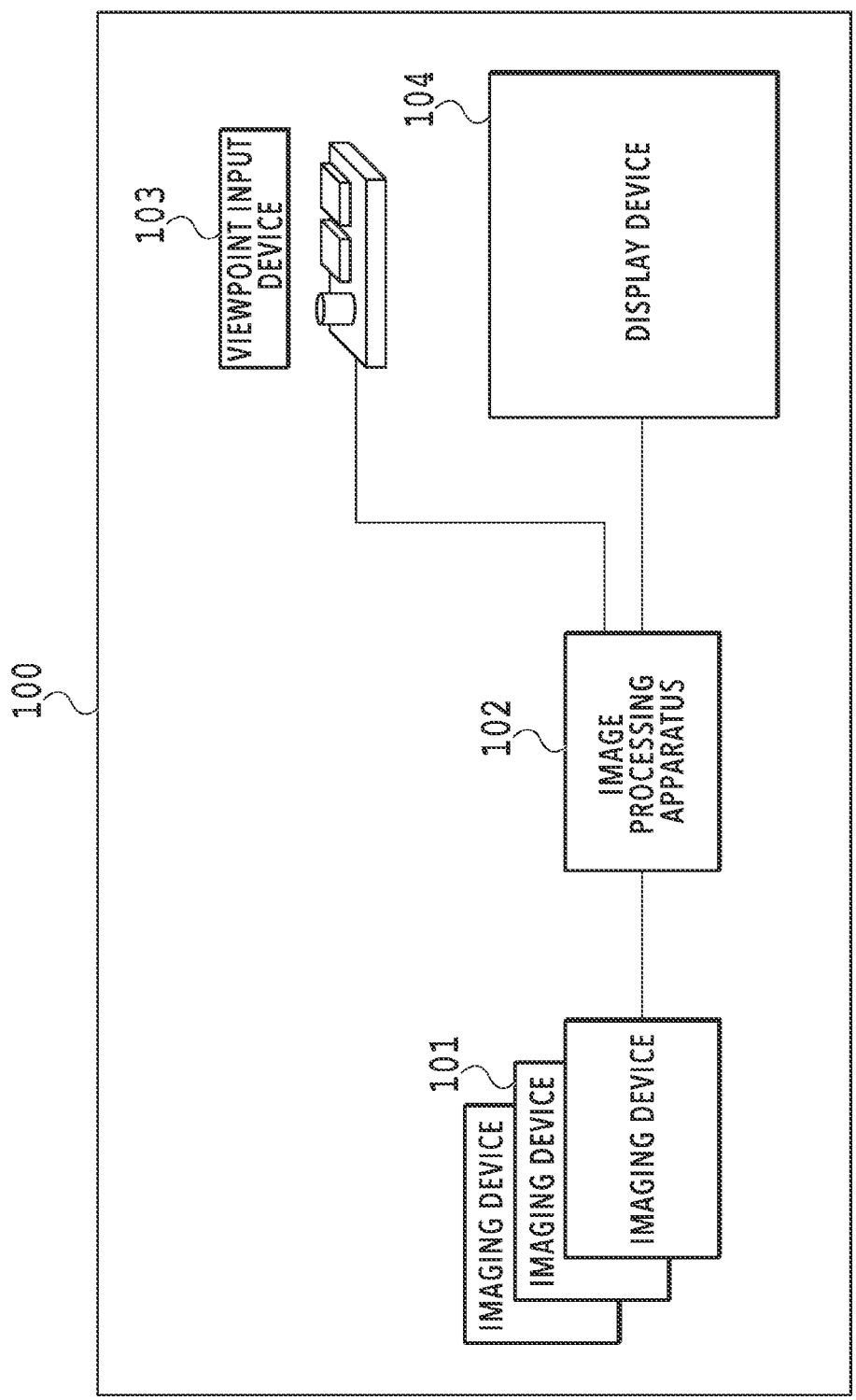
FIG. 1 a diagram showing an example of a configuration of an image processing system for generating a virtual viewpoint image.

FIG. 1 is a diagram showing an example of the configuration of an image processing system for generating a virtual viewpoint image according to the present embodiment. An image processing system 100 has a plurality of imaging devices (cameras) 101, an image processing apparatus 102, a viewpoint input device 103, and a display device 104. In the image processing system 100, based on a plurality of captured images (multi-viewpoint image) obtained by synchronous image capturing by the plurality of the imaging devices 101 and the virtual viewpoint that is set by the viewpoint input device 103, the image processing apparatus 102 generates a virtual viewpoint image and displays it on the display device 104. The area that is the target of the synchronous image capturing by the plurality of the imaging devices 101 is a filed in a stadium in which a game, for example, such as rugby and soccer, is played, a stage of a concert hall on which theater or the like is played. For example, in a case where a virtual viewpoint image is generated by taking a game of rugby that is played in a stadium as a target, the imaging devices 101 are installed at different positions so as to surround the field within the stadium and each imaging device captures the field in time synchronization. However, it is not necessarily required for the plurality of the imaging devices 101 to be installed along the entire circumference of the image capturing-target area and in a case where the installation position is limited, it may also be possible to install the imaging devices 101 only in part of the direction of the image capturing-target area. Each imaging device 101 is implemented by, for example, a digital video imaging device equipped with an image signal interface represented by a serial-digital interface (SDI). Each imaging device 101 attaches time information represented by a time code to an image signal to be output and outputs the image signal to the image processing apparatus 102.

The image processing apparatus 102 generates a virtual viewpoint image based on the image obtained by the plurality of the imaging devices 101 performing synchronous image capturing. The image processing apparatus 102 generates a virtual viewpoint image by performing processing, such as generation of three-dimensional shape data of an object by using an image captured by each imaging device 101, which is acquired via a network cable or the like, and rendering. Further, the image processing apparatus 102 also performs the setting of a virtual viewpoint (creation of camera path information) based on the user operation signal that is input from the viewpoint input device 103. Details of the function of the image processing apparatus 102 will be described later.

The viewpoint input device 103 is an input device having a controller, such as a joystick. An operator performs various setting operations relating to the virtual viewpoint via the viewpoint input device 103.

The display device 104 acquires the image data (data of the UI screen for the graphical user interface and data of the virtual viewpoint image) that is sent from the image processing apparatus 102 and displays the image data. The display device 104 is implemented by, for example, a liquid crystal display, an LED or the like.

In the present specification, the series of explanation is given by taking a case as an example where a virtual viewpoint image is generated, but it is also possible to apply the following contents to a case where the camera path of a CG image is generated and edited. In that case, the image processing system comprises a CG renderer in place of a module that generates a virtual viewpoint image. Then, it is sufficient to handle a viewpoint that can be moved to an arbitrary position within the CG space as a virtual viewpoint in the present embodiment.

<About Hardware Configuration>

Figure 2:
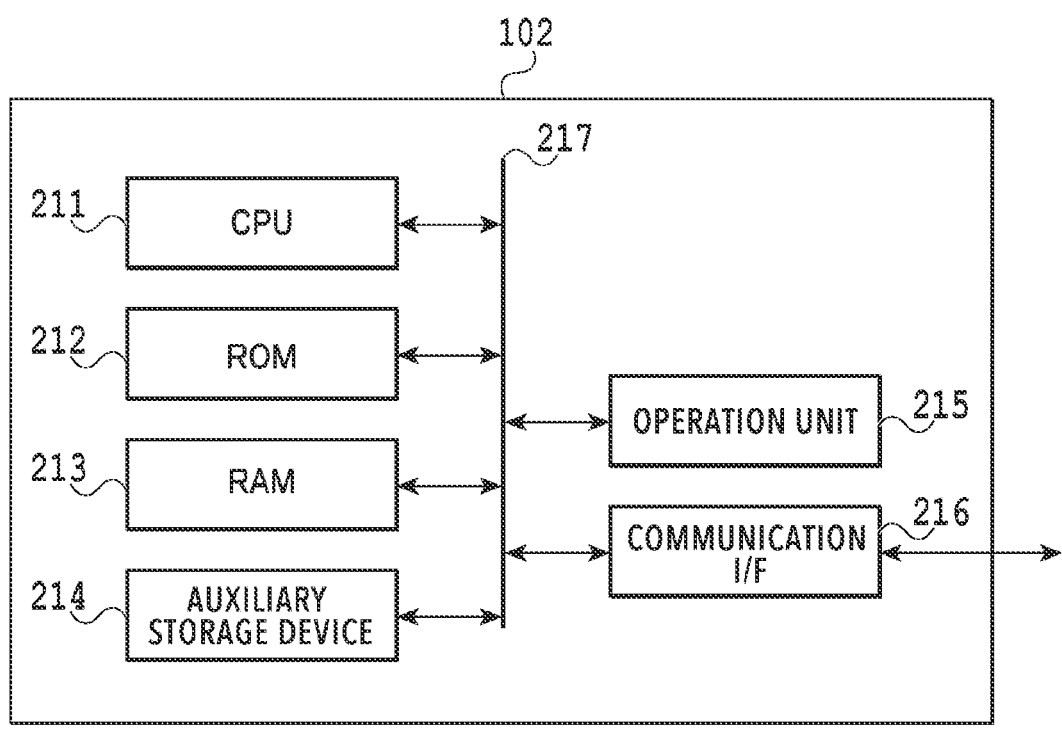
FIG. 2 is a diagram showing a hardware configuration of an image processing apparatus.

FIG. 2 is a diagram showing the hardware configuration of the image processing apparatus 102. The image processing apparatus 102, which is an information processing apparatus, has a CPU 211, a ROM 212, a RAM 213, an auxiliary storage device 214, an operation unit 215, a communication I/F 216, and a bus 217.

The CPU 211 implements each function of the image processing apparatus 102 by controlling the entire image processing apparatus 102 by using computer programs and data stored in the ROM 212 or the RAM 213. It may also be possible for the image processing apparatus 102 to have one or a plurality of pieces of hardware or a GPU (Graphics Processing Unit) different from the CPU 211. Then, it may also be possible to cause a GPU or dedicated hardware to perform at least part of the processing by the CPU 211. As examples of the dedicated hardware, mention is made of ASIC (Application-Specific Integrated Circuit), FPGA (Field Programmable Gate Array), DSP (Digital Signal Processor) and the like.

The ROM 212 stores programs that do not need to be changed, and the like. The RAM 213 temporarily stores programs and data supplied form the auxiliary storage device 214, data supplied from the outside via the communication I/F 217, and the like. The auxiliary device 214 includes, for example, a hard disk drive and the like and stores various kinds of data, such as image data and volume data.

The display unit 215 includes, for example, a liquid crystal display, an LED and the like, and displays a GUI (Graphical User Interface) for a user to operate the image processing apparatus 102, and the like. The operation unit 215 includes, for example, a keyboard, a mouse and the like, and receives an operation by a user and inputs various instructions to the CPU 211. The CPU 211 operates as a display control unit configured to control the display device 104 and an operation control unit configured to control the operation unit 215. The communication I/F 216 is used for communication with an external device of the image processing apparatus 102. For example, in a case where the image processing apparatus 102 is connected with an external device by a wire, a communication cable is connected to the communication I/F 216. In a case where the image processing apparatus 102 has a function to wirelessly communicate with an external device, the communication I/F 216 comprises an antenna.

The bus 217 connects each unit of the image processing apparatus 102 and transmits information. In the present embodiment, the viewpoint input device 103 and the display device 104 are provided as external devices, but it may also be possible to provide each of them in the form in which it exists internally as one of the function units of the image processing apparatus 102.

<About Function Configuration>

Figure 3:
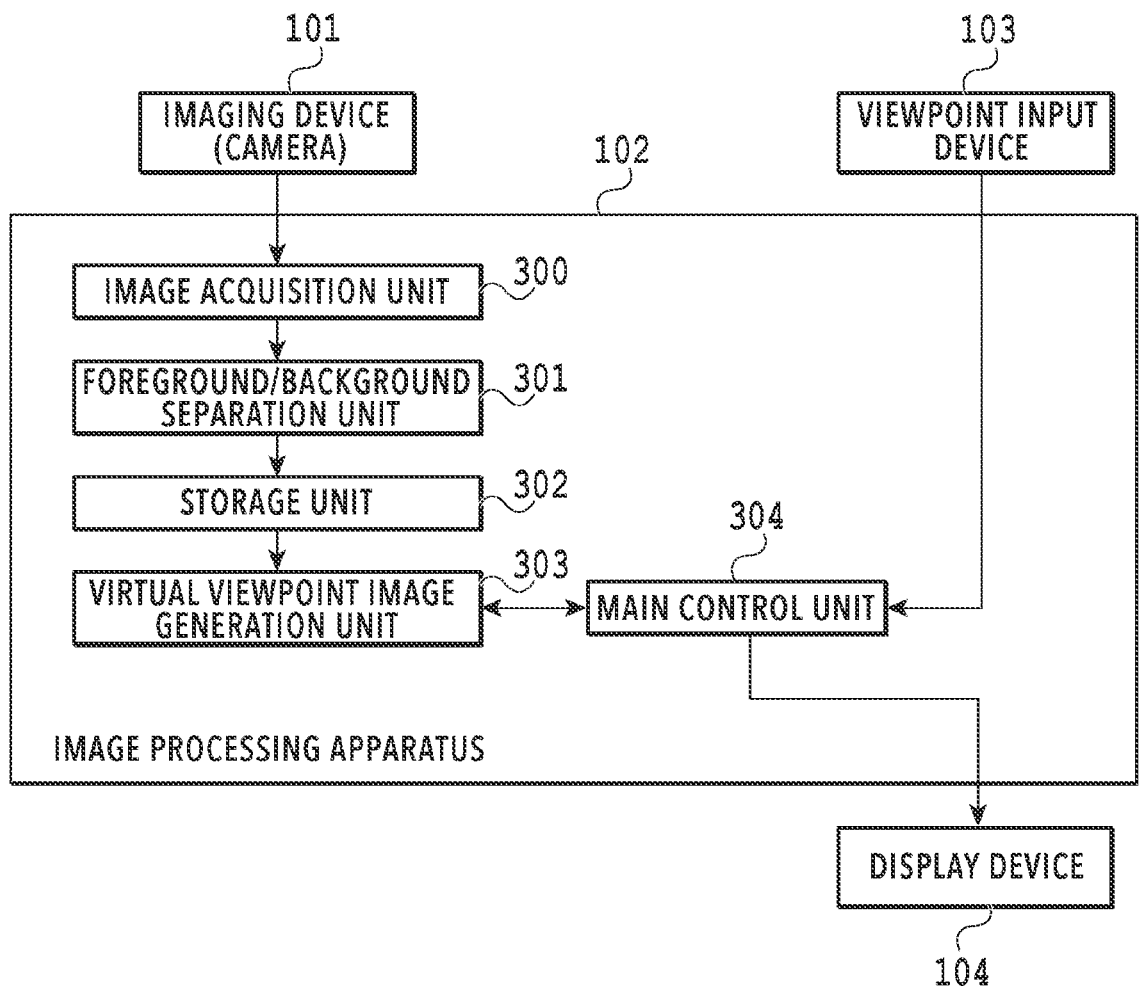
FIG. 3 is a block diagram showing a function configuration of the image processing apparatus.

FIG. 3 is a block diagram showing the function configuration of the image processing apparatus 102. The image processing apparatus 102 has an image acquisition unit 300, a foreground/background separation unit 301, a storage unit 302, a virtual viewpoint image generation unit 303, and a main control unit 304.

The image acquisition unit 300 acquires data of the image (multi-viewpoint image) obtained by the plurality of the imaging devices 101 performing synchronous image capturing.

The foreground/background separation unit 301 extracts, for each frame, a specific object (in the following, called "foreground object"), which is a foreground, such as a player and a referee, from each image of the multi-viewpoint image obtained by the plurality of imaging devices 101. The foreground/background separation unit 301 causes the storage unit 302 to store the image indicating the extracted foreground object as a foreground image. The method of extracting a foreground object is not limited. For example, as the extraction method of a foreground object, there is a background difference method. The background difference method is a method of extracting a foreground object within a frame by comparing the pixel value of a frame (still image) within the image and pixel value of the background image indicating the background portion thereof. The background image is an image in the state where no foreground object exists and for example, in a case where image capturing is performed by taking a game of rugby as a target, an image obtained by performing image capturing before the game starts where no player exists in the field is used. The foreground/background separation unit 301 stores the background image and the foreground image along with the image capturing position information indicating the three-dimensional position of the imaging device 101. The three dimensional position is specified by the position in each direction, which corresponds to the height, width, and depth in the image capturing-target three dimensional space. The image capturing position information in accordance with the world coordinate system is obtained by, for example, capturing a marker or the like set in advance and performing three-dimensional image measurement of the marker. The background image and the foreground image are stored in the RAM 213 or the auxiliary storage device 214 by the storage unit 302.

The main control unit 304 generates camera path information based on the user operation via the viewpoint input device 103 and provides the camera path information to the virtual viewpoint image generation unit 303. Here, the camera path information is information indicating transition of the viewpoint of the virtual camera (virtual viewpoint) that does not exist actually, which corresponds to a virtual viewpoint image in which the virtual viewpoint images for each frame are arranged in a time series. The position and orientation of the camera in the camera path information correspond to the position of each virtual viewpoint and the line-of-sight direction from the virtual viewpoint, respectively. Further, the camera path information is parameters representing the position and orientation of the camera and consists of a plurality of parameters continuous in terms of time. That is, the camera path information is virtual viewpoint information representing transition in terms of time of the position of the virtual viewpoint and the line-of-sight direction from the virtual viewpoint. The generated camera path information is output to the virtual viewpoint image generation unit 303

The virtual viewpoint image generation unit 303 generates three-dimensional shape data of the foreground object based on the foreground image, performs coloring processing (texture pasting processing) in accordance with the camera path information for the three-dimensional shape data, and generates an image that represents an appearance from the virtual viewpoint. As the generation method of three-dimensional shape data, mentions is made of, for example, the visual hull method (shape-from-silhouette method) and the method is not limited in particular. At the time of generating three-dimensional shape data, the position and size of the foreground object in the image capturing-target space are also specified. The generated virtual viewpoint image is output to the display device 104.

A plurality of the image processing apparatuses 102 may exist. For example, it may also be possible to perform the processing up to the generation of the virtual viewpoint image in another image processing apparatus having each function of the above-described image acquisition unit 300, the foreground/background separation unit 301, the storage unit 302, and the virtual viewpoint image generation unit 303. In that case, the image processing apparatus 102 provides the camera path information for generating the virtual viewpoint image to the other image processing apparatus. Further, it is also possible to apply the image processing apparatus 102 to editing of the camera path of a CG image. At that time, it is sufficient to provide a CG renderer in place of the virtual viewpoint image generation unit 303. In this case, the camera path that is generated by a method, to be described later, represents a locus of the viewpoint in the CG image.

<About Details of Main Control Unit>

Figure 4:
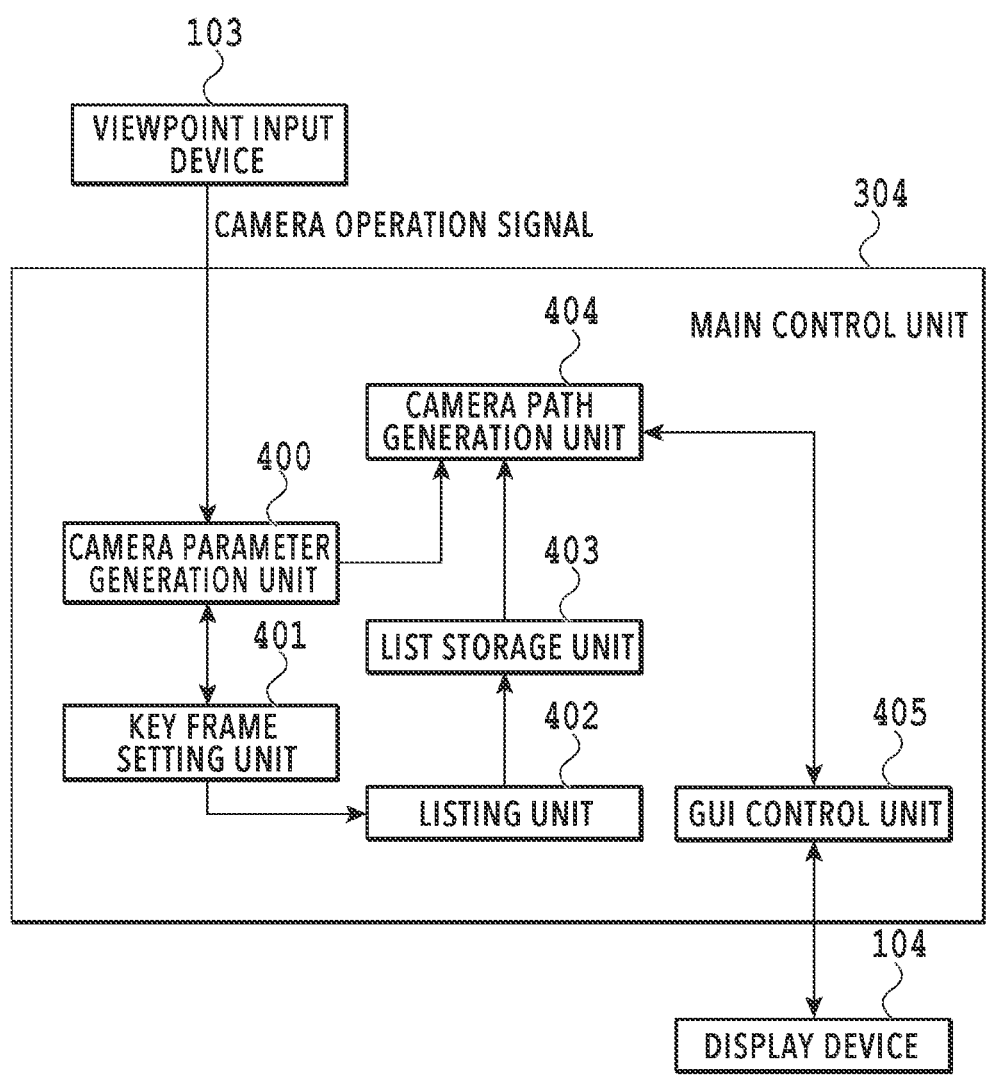
FIG. 4 is a block diagram showing a function configuration relating to creation and editing of a camera path.

FIG. 4 is a block diagram showing an example of the function configuration within the main control unit 304 relating to creation and editing of a camera path. The main control unit 304 includes a camera parameter generation unit 400, a key frame setting unit 401, a listing unit 402, a list storage unit 403, a camera path generation unit 404, and a GUI control unit 405. In the following, each unit is explained.

The camera parameter generation unit 400 acquires an operation signal (in the following, called "camera operation signal") designating the position and orientation of the virtual camera, which a user inputs by operating a joystick and the like, from the viewpoint input device 103. Then, the camera parameter generation unit 400 sets camera parameters of a camera that does not exist actually, which corresponds to a virtual viewpoint, based on the acquired camera operation signal. The camera parameters of the present embodiment include parameters, such as the position and orientation of the virtual viewpoint, zoom, and time. In this case, the position of the virtual viewpoint is indicated by, for example, three-dimensional coordinate information in accordance with an orthogonal coordinate system with three axes of an X-axis, a Y-axis, and a Z-axis. The origin at that time is an arbitrary position within the image capturing-target three-dimensional space (in the present embodiment, the filed center in the stadium). Further, the orientation of the camera corresponding to the virtual viewpoint is indicated by angles formed with three axes of pan, tilt, and roll, respectively. Further, the zoom is indicated by, for example, the focal length. Further, the time is indicated by the time code that takes time at which the image capturing-target game is started as the 00h:00m:00s:00 frame. The zoom and time are each a one-axis parameter. Consequently, the camera parameters in the present embodiment have parameters of the eight axes of the X-coordinate, Y-coordinate, Z-coordinate, pan, tilt, roll, zoom, and time code. A parameter that specifies another element other than these eight axes may be included or it is not necessary to include all these eight axes. The camera parameters that are set based on the user operation are sent to the key frame setting unit 401.

The key frame setting unit 401 generates a key frame in which the camera parameters input from the camera parameter generation unit 400 and times in the period during which image capturing is performed by a plurality of the imaging devices 101 are associated with each other and sets the key frame in association with a frame designation signal. Here, the frame designation signal is a signal instructing that the specific frame relating to the selection of an operator among the frame group configuring the multi-viewpoint image be set as the key frame and input from the viewpoint input device 103. It is necessary to set at least two key frames. The information on the set key frames is output to the listing unit 402.

The listing unit 402 creates a list in which key frames are arranged in predetermined order by arranging key frame information capable of uniquely identifying the key frame corresponding to the key frame set by the key frame setting unit 401 in accordance with the arrangement mode set via the GUI. The listing of the key frames will be described later. The created key frame list is output to the list storage unit 403.

The list storage unit 403 stores the key frame list received from the listing unit 402. The stored key frame list is read by the camera path generation unit 404 and used for creation of camera path information.

The camera path generation unit 404 generates camera path information based on the camera parameters input from the camera parameter generation unit 400 and the key frame list stored by the list storage unit 403. The camera path information is managed by a time line consisting of a plurality of frames and to each frame, information necessary for generation of each image configuring the virtual viewpoint image, specifically, information on the time of the scene and the position and orientation of the virtual viewpoint is attached. The time of the scene is represented by, for example, a time code that takes the time at which the image capturing-target game is started as 00h:00m:00s:00. The position of the virtual viewpoint is represented by three-dimensional coordinates by the three axes of the X-axis, the Y-axis, and the Z-axis described above. The orientation of the virtual viewpoint is represented by three angles of pan, tilt, and roll described above. The number of frames included in the time line is determined by the number images included per second (frame rate). For example, in a case where the frame rate is 60 f/s, 60 frames per second are included in the time line. In the setting and editing of the camera path, the frame is divided into two kinds of key frame and intermediate frame. The key frame is a frame in which an operator explicitly designates the position, orientation and the like of the virtual viewpoint. On the other hand, the intermediate frame is a frame used to fill in the gap between the key frames. The camera path generation unit 404 determines camera parameters corresponding to the intermediate frame by performing interpolation processing based on the key frame designated by an operator. In this manner, camera path information represented by a set of camera parameters continuous in terms of time is obtained.

The GUI control unit 405 controls the graphical user interface and receives user instructions for creating and editing the above-described camera path information, and the like.

It is also possible to use the image processing apparatus 102 including each of the above-described units for creation and editing of the camera path of a CG image. At that time, it is sufficient to provide a CG render in place of the virtual viewpoint image generation unit 303. In this case, the camera path that is generated by a method, to be described later, represents the locus of the viewpoint in the CG image.

(Explanation of Problem to be Solved)

Here, the problem that the technique according to the present disclosure should solve is explained in detail with reference to FIG. 5 and FIG. 6. Here, as the key frame arrangement mode, an operation mode (in the following, called "time code mode") that automatically arranges key frames in ascending order in a time series along the time code is considered. In the following explanation, a case where playback is performed in order from the time whose time code is small to the time whose time code is large (ascending order) is defined as "forward playback" and a case where playback is performed in order from the time whose time code is the large to the time whose time code is small (descending order) is defined as "reverse playback".

FIG. 5 is a diagram showing a process in which four key frames that are set sequentially are automatically arranged under the time code mode and a key frame list (in the following, simply described as "list") is completed. For convenience of explanation, in lists 501 to 504 shown in FIG. 5, only the number that is attached to each set key frame and the corresponding time code are shown.

The list 501 shows the arrangement of the key frame information in the virtual viewpoint image (video clip) a user desires to create finally and the lists 502 to 504 show the arrangement of the key frame information at each setting point in time of the key frames that are set sequentially. Further, the portions indicated in thick characters in FIG. 5 each indicate the key frame information on the key frame that is added at the second setting point in time, the third setting point in time, and the fourth setting point in time. As described previously, in the time code mode, the key frame information is arranged so as to be arranged in ascending order in a time series along the time code. Consequently, at the time of the third key frame whose time codes is "20:05:53:15" being set, the key frame information on the key frame is automatically arranged at the position of No. 2 (see list 503). Similarly, at the time of the fourth key frame whose time code is "20:05:48:08" being set as well, the key frame information on the key frame is arranged at the position of No. 2 (see list 504). As above, in the time code mode, the key frame information is arranged so as to be arranged in order from the key frame information whose figure of the time code is small to that whose figure is large. Because of this, in a case where a video clip whose playback direction is forward playback is created, it is not necessary for an operator to manually rearrange the key frame information, and therefore, this is convenient. However, in a case where a video clip whose playback direction is reverse playback is created, the time code mode is inconvenient on the contrary. The following problem occurs, for example, in a case where a camera path in which forward playback and reverse playback exist in a mixed manner is generated. The reason for that is explained by using FIG. 6.

Figure 6:
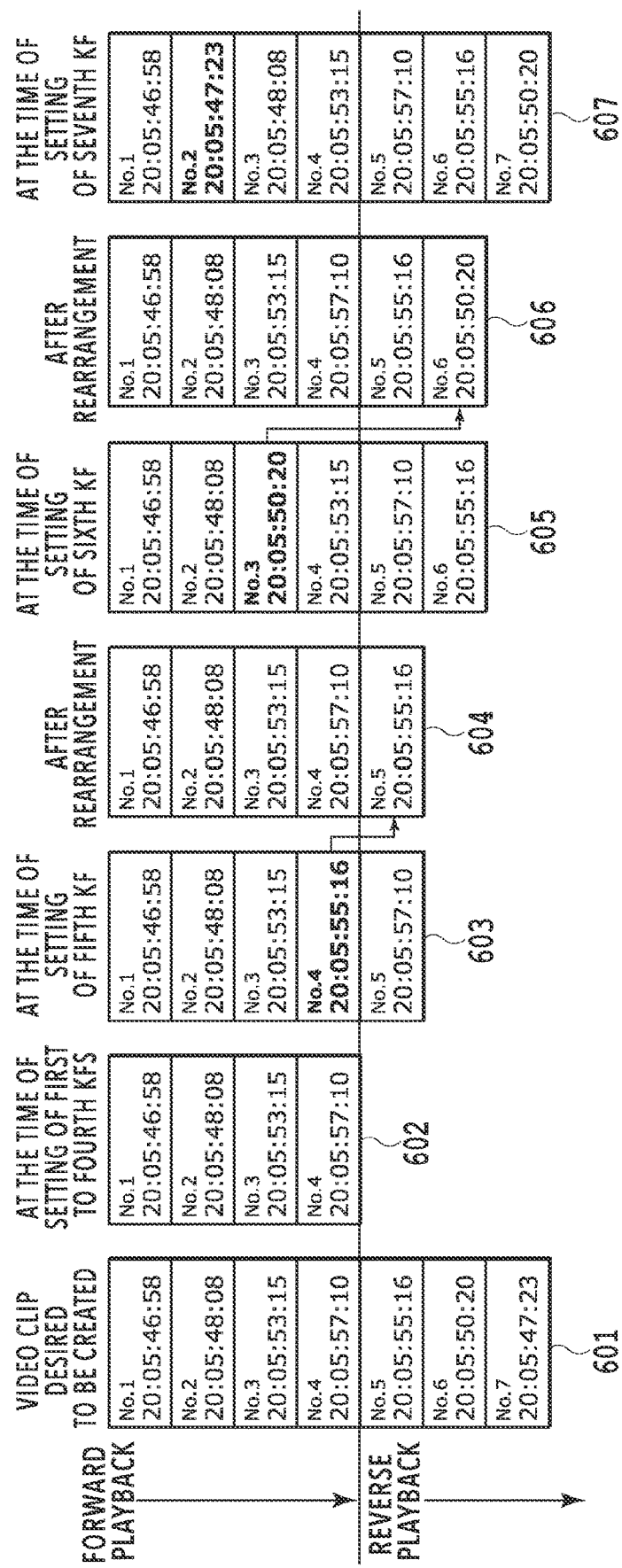
FIG. 6 is a diagram explaining a drawback at the time of creating a video clip of reverse playback in a time code mode.

In FIG. 6 as well, as in FIG. 5, a list 601 of a video clip an operator desires to create finally is shown at the leftmost end. Here, in the video clip an operator desires to create, No. 1 to No. 4 are image portions of forward playback and No. 5 to No. 7 are image portions of reverse playback. For No. 1 to No. 4 of forward playback, no problem arises because the key frames are arranged in ascending order along the time code (see list 602). However, in a case where the fifth key frame information of reverse playback is arranged in ascending order, the results will be like a list 603, and this does not match with the arrangement of key frame information (see list 601) intended by the operator. In this case, at the point in time at which the fifth key frame is set, it is necessary for the operator to bring about the state of a list 604 by rearranging the key frame information arranged at the position of No. 4 to the position of No. 5. Similarly, in a case where the sixth key frame is set, as shown in a list 605, the key frame information on the key frame is arranged at the position of No. 3, and therefore, the operator needs to bring about the state of a list 606 by rearranging the key frame information at the position of No. 6. The, in a case where the seventh key frame is set as well, as shown in a list 607, the key frame information on the key frame is arranged at the position of No. 2, and therefore, the operator needs to bring about the state of the list 601 that is aimed at by rearranging the key frame information at the position of No. 7. It is necessary for the operator to recognize where the key frame information corresponding to a newly added key frame is arranged within the list and repeat the setting of the key frame and rearrangement of the key frame information while paying attention to the correct arrangement, and therefore, the load at the time of creating a video clip is heavy.

The technique of the present disclosure proposes a method of both appropriately and automatically arranging information specifying key frames to be set sequentially in accordance with the playback direction in a target video clip in order reduce the load of an operator at the time of camera path information creation.

(Creation of Camera Path Information)

Figure 7:
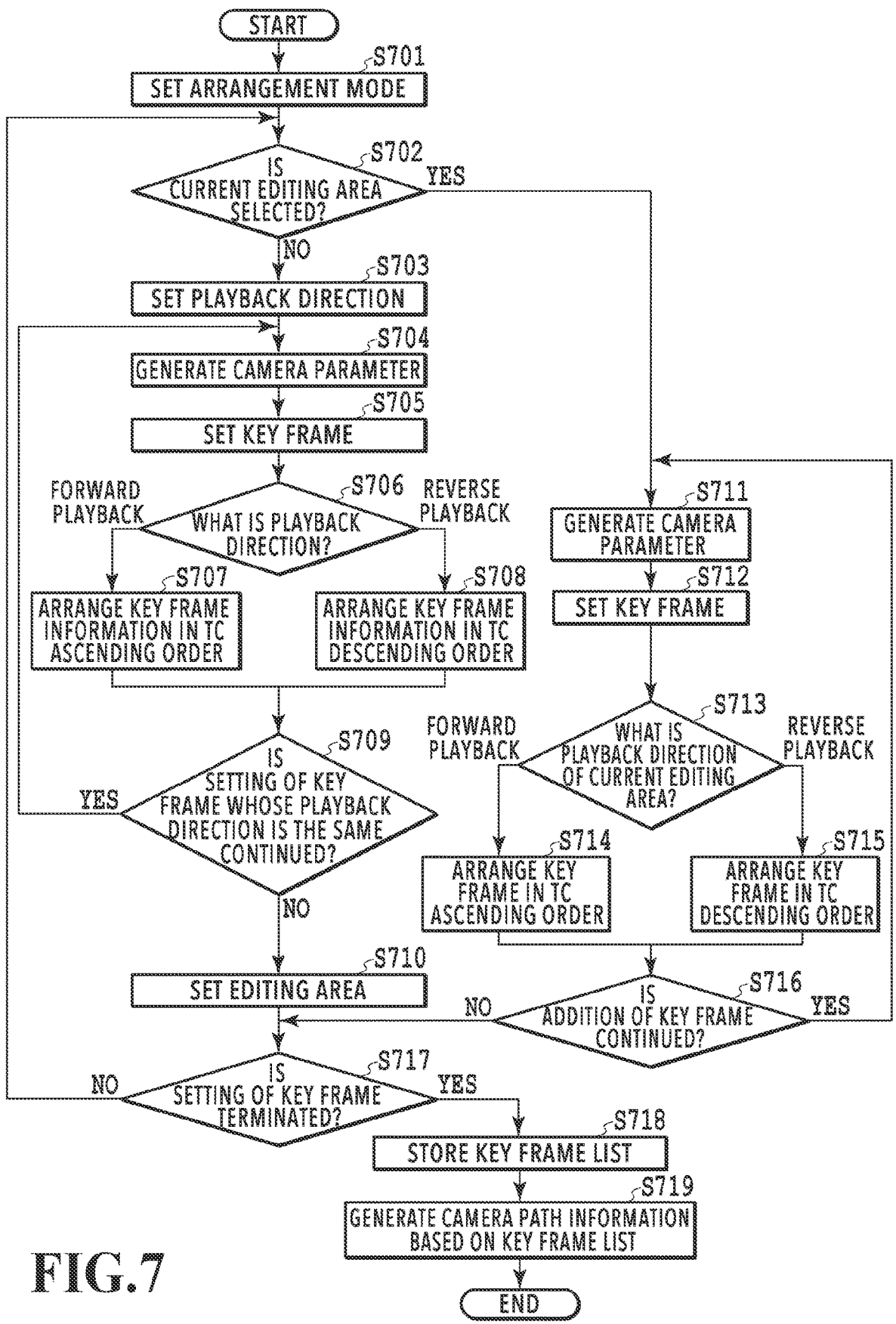
FIG. 7 is a flowchart showing a flow of control to create camera path information that takes into consideration the playback direction of a video clip.
Figure 8:
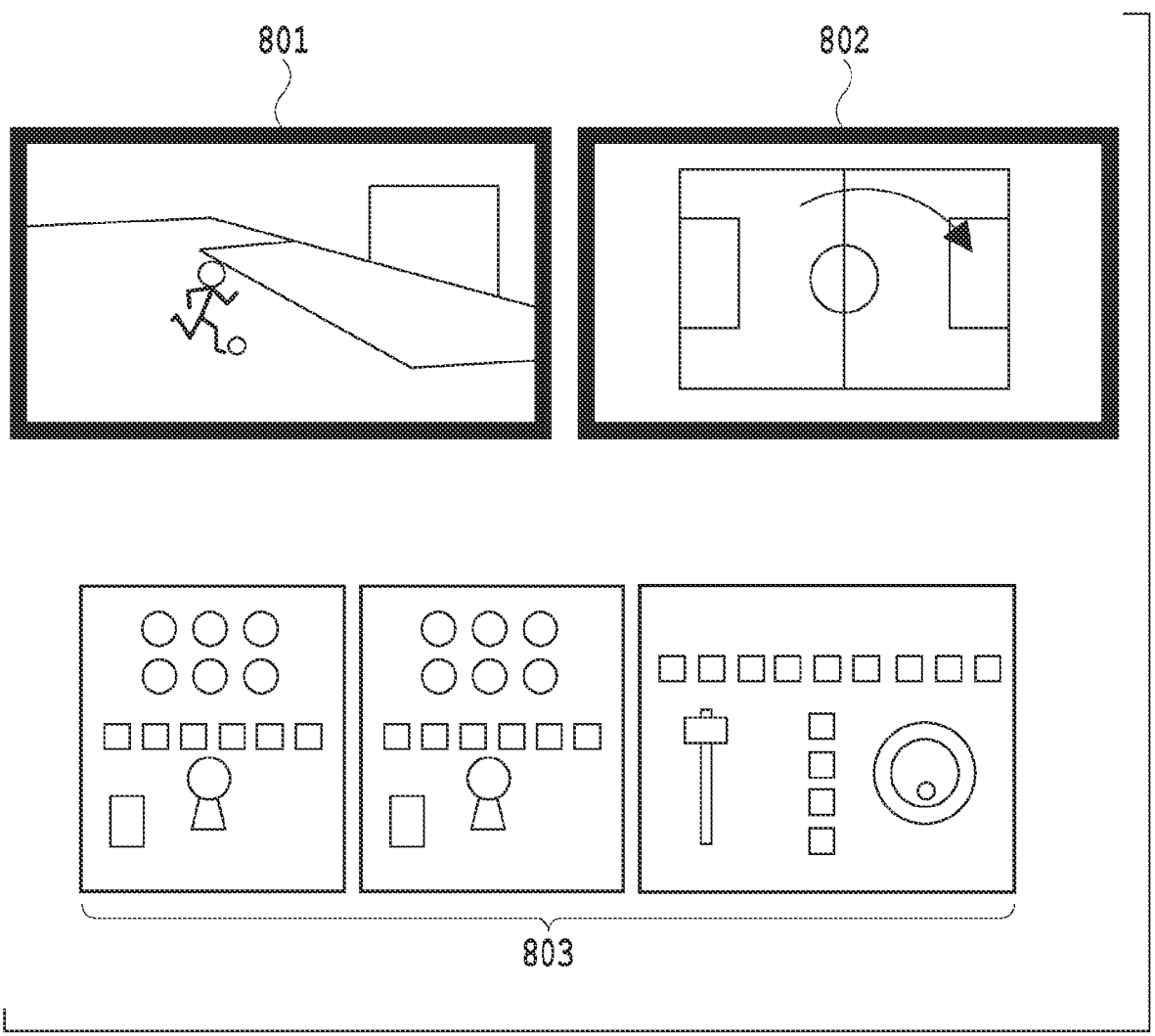
FIG. 8 is a diagram showing an example of a GUI and a controller for creating and editing camera path information.

Following the above, details of the creation processing of camera path information in the main control unit 304 are explained. FIG. 7 is a flowchart showing a flow of control at the time of creating camera path information that takes into consideration the playback direction in a video clip that is desired to be created according to the present embodiment. The series of processing shown in the flowchart in FIG. 7 is performed by the CPU 211 of the image processing apparatus 102 loading program codes stored in the ROM 212 onto the RAM 213 and executing the program codes. Further, it may also be possible to implement part or all of the functions at the steps in the present embodiment by hardware, such as an ASIC or an electronic circuit. FIG. 8 is a diagram showing an example of a GUI and a controller for creating and editing camera path information. Two UI screens 801 and 802 are displayed on the display device 104 and a controller 803 configures the operation unit of the viewpoint input device 103. On the UI screen 801, a multi-viewpoint image that is the base of a virtual viewpoint image and a virtual viewpoint image generated based on camera path information are displayed. The UI screen 802 is used to set the arrangement mode and the key frame, to check the generated camera path, and so on. For example, it is possible for an operator to edit a camera path that is displayed on the UI screen 802 while checking the image that represents the appearance from the virtual viewpoint in each frame being edited on the UI screen 801. In the following explanation, symbol "S" means a step.

At S701, in accordance with the operation of an operator via the GUI, the key frame arrangement mode is set. FIG. 9A to FIG. 9C are each a diagram for explaining an example of the GUI. FIG. 9A and FIG. 9B each show an example of the GUI for performing the setting relating to listing of key frames. In FIG. 9A, in a "Key order" field 901 at the top left, the name of the arrangement mode being set is displayed. In a case where an operator clicks the field 901, alternatives are displayed in a pulldown manner as shown in FIG. 9B. The contents indicated by each alternative are as follows.

Time Code: operation mode of arranging in ascending order in a time series along time code Key Frame: operation mode of arranging in order of the setting of key frame Play×Time Code: operation mode of arranging in a time series along time code while taking into consideration the playback direction An operator selects a desired arrangement mode from among the above-described alternatives displayed in a pulldown manner. Here, the state is such that "Play×Time Code" for creating camera path information that takes into consideration the playback direction is selected by an operator. Then, under "Key order", each item name as follows is displayed.

"rearrangement button (▲▼)"

"key frame number (Key No.) and time code (hh:mm:ss:ff)"

"playback direction (Play dir.)"

"position and orientation of virtual camera (Camera Position)"

The information corresponding to each of these items is added each time a key frame is set and a key frame list is completed. Further, at this time, key frame information 902 corresponding to the set key frame is arranged under the field 901.

The "rearrangement button (▲▼)" is used in a case where an operator manually rearranges the key frame information within the list. In a case where the upward button is pressed, the key frame information being selected is exchanged with the key frame information located thereabove. Similarly, in a case where the downward button is pressed, the key frame information being selected is exchanged with the key frame information located therebelow.

The "key frame number (Key No.) and time code (hh:mm:ss:ff)" indicates the arrangement order of the key frame information within the list and the key frame information is arranged in the playback order in the video clip that is created. Under the key frame number, the time code corresponding to the key frame is indicated. Here, "hh" in the time code represents time, "mm" represents minute, "ss" represents second, and "ff" represents frame number. In FIG. 9A, the state is such that only one key frame having the time code of "20h:05m:46s:58th frame" is set.

In the "playback direction (Play dir.)", information relating to the playback direction, specifically, whether playback is forward playback or reverse playback is displayed.

In the "position and orientation of virtual camera (Camera Position)", the position of the virtual viewpoint associated with the key frame is indicated by three coordinates of X, Y, and Z and the orientation is indicated by each of three angles of Pan, Tilt, and Roll.

In the following, explanation of S702 and subsequent steps is given on the premise that "Play×Time Code" is selected as the arrangement mode. The key frame arrangement control in a case where "Time Code" or "Key Frame" is set as the arrangement mode is well known, and therefore, explanation is omitted.

Figure 10:
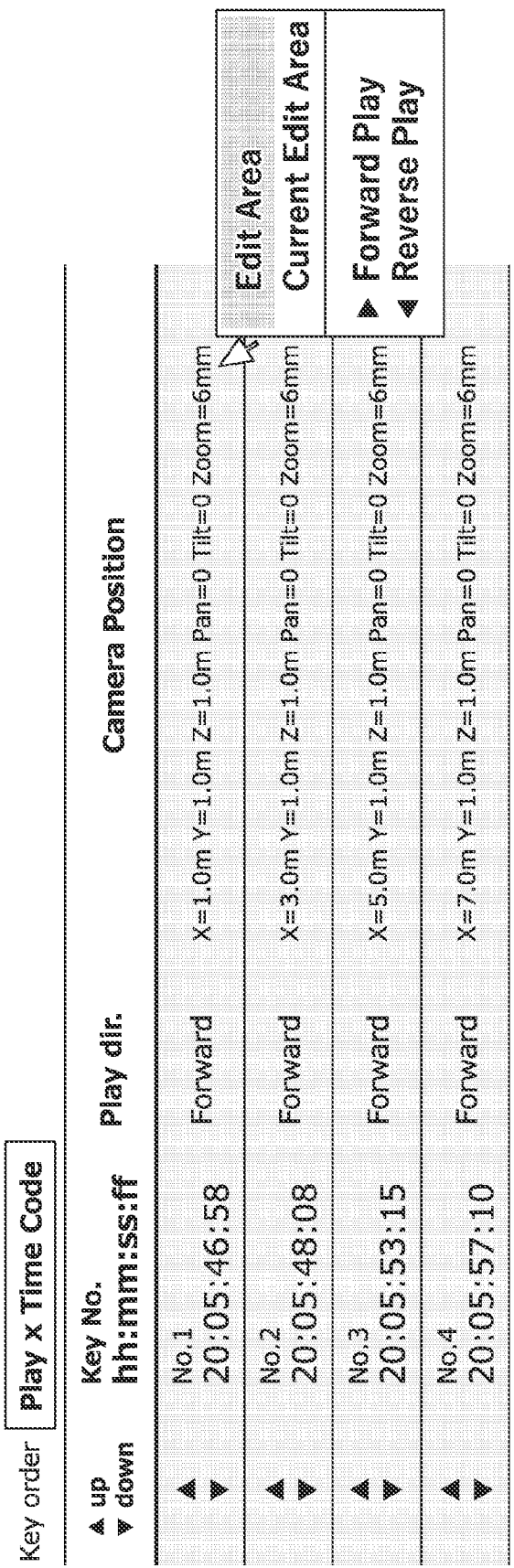
FIG. 10 is a diagram showing a GUI for listing key frames.

At S702, whether or not the key frame that an operator is going to set from now is addition to the editing area of interest (in the following, called "current editing area") among the already-set editing areas within the list is determined. Here, the editing area means the area within the list that takes a key frame group whose playback direction is the same as one of setting units and is designated by an operator (S710, to be described later). FIG. 10 is a diagram showing the way an operator sets the editing area via the GUI. As shown in FIG. 10, an operator sets the editing area by performing right clicking in the state where one or a plurality of pieces of key frame information is selected to display a context menu 1001 and selecting "Edit Area". Due to this, an editing area consisting of arbitrary key frame information relating to user selection is set. In the example in FIG. 10, the editing area including four pieces of key frame information is set. FIG. 11 is a diagram showing the way an operator selects and sets the current editing area from the two already-set editing areas. As shown in FIG. 11, an operator right-clicks on the area that the operator desires to select as the current editing area to display the context menu 1001 and selects "Current Edit Area" this time. Due to this, the current editing area is set. In the example in FIG. 11, in a case where the current editing area is set, the time code within the current editing area is displayed in thick characters so that it is possible to distinguish the current editing area from the other editing area. However, what is required is only to enable an operator to make a distinction, and therefore, for example, it is sufficient to change the color of the background and the like. Although not shown schematically, it is possible to cancel the setting state of the current editing area by performing the cancellation operation for the area in the state where the current editing area is set. At this step, in a case where the selection operation of the current editing area shown in FIG. 11 is detected, the processing advances to S711. On the other hand, in a case where the selection operation of the current editing area is not detected, the processing advances to S703. In the stage immediately after the start of the processing (in the state where the key frame information corresponding to the set key frame does not exist within the list), the already-set editing area dose not exist originally, and therefore, the processing advances to S703 without exception.

At S703, the key frame setting unit 401 sets the playback direction for the key frame that is set from now based on user instructions via the GUI. As shown in FIG. 9, an operator clicks the portion of "Play dir." and selects "Forward" meaning forward playback or "Reverse" meaning reverse playback from among the alternatives displayed in a pull-down manner. In accordance with the selection operation, the playback direction is set. Here, in the example in FIG. 9A, the state is such that "Forward" representing forward playback is set.

At S704, the camera parameter generation unit 400 generates the camera parameter described previously based on the camera operation signal that is sent from the viewpoint input device 103. At S705 that follows, the key frame setting unit 401 sets the key frame based on the frame designation signal that is sent from the viewpoint input device 103. At this time, the camera parameter generated at S704 is associated with the key frame. The information on the key frame thus set is sent to the listing unit 402.

At next S706, the listing unit 402 determines whether to perform the processing to arrange the key frame information corresponding to the key frame that is set at S705 in time code ascending order or time code descending order based on the playback direction set at S703. In a case where the set playback direction is "Forward", the processing advances to S707 and in a case of "Reverse", the processing advances to S708.

At S707, the listing unit 402 arranges the key frame information on the key frame that is set at S705 within the list in time code ascending order. On the other hand, at S708, the listing unit 402 arranges the key frame information on the key frame that is set at S705 within the list in time code descending order.

At S709, whether to continue the setting of the key frame whose playback direction is the same or to perform the setting of the above-described editing area is determined. In a case where the camera operation signal is newly input from the viewpoint input device 103 in succession, the processing returns to S704 to continue the generation of the camera parameter and the setting of the key frame. On the other hand, in a case where the user operation to set the editing area described previously is detected, the processing advances to S710. Then, at S710, the listing unit 402 sets the range designated by the user operation as the editing area. After the setting of the editing area, the processing advances to S717.

At S717, whether or not to terminate the key frame setting for the creation-target video clip is determined. For example, in a case where the operation (for example, pressing down of "Save" button, not shown schematically) of an operator to give instructions to store the key frame list via the GUI is detected, it is determined that the key frame setting work is completed and the processing advances to S718. On the other hand, in a case where there are no instructions to store the key frame list, the processing returns to S702 and the processing is continued.

At S711 in a case where the selection of the current editing area is detected in the determination processing at S702 to which the processing has returned, as at S704, the camera parameter generation unit 400 generates the camera parameter described previously based on the camera operation signal that is sent from the viewpoint input device 103. At S712 that follows, as at S705, the key frame setting unit 401 sets the key frame in association with the camera parameter generated at S711 based on the frame designation signal that is sent from the viewpoint input device 103.

At S713, the listing unit 402 determines whether to perform the arrangement processing of the key frame information corresponding to the key frame set at S712 in time code ascending order or in time code descending order based on the playback direction that is set to the current editing area. Then, in a case where the playback direction of the current editing area is "Forward", the processing advances to S714 and in a case of "Reverse", the processing advances to S715.

S714 and S715 correspond to S707 and S708 described previously, respectively. That is, at S714, the key frame information on the key frame set at S712 is arranged within the current editing area in time code ascending order and at S715, the key frame information on the key frame set at S712 is arranged within the current editing area in time code descending order. In the current editing area, the already-arranged key frame information exists, and therefore, the key frame information on the key frame that is newly added is inserted at an appropriate position in accordance with the time code and the playback direction. At this time, it is desirable to highlight (display in solid white character) or the like, for example, the portion of the relevant key frame number and the time code so that an operator can grasp at which the key frame information on the added key frame is arranged.

At S716, whether or not to continue the addition of the key frame to the current editing area is determined. In a case where the camera operation signal is input newly from the viewpoint input device 103, the processing returns to S711 in order to continue the generation of the camera parameter and the addition setting of the key frame. On the other hand, in a case where the user operation to cancel the setting of the current editing area is detected, the processing advances to S717 described previously and whether or not to continue the setting of the key frame is determined.

At S718, the list storage unit 403 stores the key frame list that is created by the processing so far in the RAM 213. Then, at S719, the camera path generation unit 404 reads and acquires the key frame list stored by the list storage unit 403 from the RAM 213 and generates camera path information based on the key frame list.

The above is the flow of the processing to generate the camera path information that takes into consideration the playback direction in the video clip desired to be created.

MODIFICATION EXAMPLE

In the flowchart in FIG. 7 described previously, a case is not supposed where the key frame having the same time code as that of the key frame information already existing within the current editing area is added. Consequently, it may also be possible to further use the similarity of the distance and the orientation between virtual viewpoints as a reference at the time of arrangement so that it is possible to cope with a case as well where the key frame having the same time code is added. FIG. 12 shows results in a case where an area 1100 shown in FIG. 11 is set as the current editing area and two key frames 1201 and 1202 having the same time code as that of the No. 3 key frame are arranged by taking the distance between the virtual viewpoints as a reference at the time of the addition thereof. In the current editing area 1100 before the addition, the virtual viewpoint position of the key frame arranged at No. 2 is (x, y, z)=(3.0, 1.0, 1.0). In a current editing area 1200 after the addition, the key frame 1201 associated with a virtual viewpoint position (x, y, z)=(4.0, 1.0, 1.0) closer to the virtual viewpoint position in the above-described No. 2 key frame is arranged newly at the No. 3 position. Then, the key frame 1202 associated with a virtual viewpoint position (x, y, z)=(6.0, 1.0, 1.0) is arranged at the No. 5 position because it is most distant from the virtual viewpoint position in the above-described No. 2 key frame. As above, by taking the distance between the virtual viewpoints as a reference, even in a case where the key frame whose time code is the same is added, it is possible to insert the key frame information at an appropriate position within the current editing area. In a case where the distance between the virtual viewpoints is also the same, it is sufficient to arrange the key frame information on the key frame of both the key frames, whose orientation at the virtual viewpoint is closer to the orientation at the immediately previous virtual viewpoint at a higher position. Further, it may also be possible to arrange the key frames in order of the setting of the key frame in place of the distance between the virtual viewpoints in order to cope with a case where the key frame having the same time code is added. FIG. 13 shows results in a case where the area 1100 shown in FIG. 11 is set as the current editing area and a key frame having the time code "20:05:47:23" the same as that of the No. 9 key frame is arranged by taking the key frame setting order as a reference at the time of addition thereof. The virtual viewpoint position of the key frame that is arranged at No. 8 in the current editing area 1110 before the addition is (x, y, z)=(4.0, 1.0, 10). In a current editing area 1300 after the addition, it can be seen that a key frame 1301 at the virtual viewpoint position (x, y, z)=(3.0, 1.0, 1.0) closer to the virtual viewpoint position of the above-described No. 8 key frame is arranged at No. 10, not at No. 9.

Further, it may also be possible to arrange the key frame information on the key frame that is added to the current editing area at the top or bottom of the current editing area at all times irrespective of the playback direction and the time code. In this case, it is necessary for an operator to perform rearrangement of the key frame information each time the key frame is added, but it is possible to reduce confusion at the time of rearrangement by arranging the key frame information at the top or end within the current editing area at all times.

Further, the flowchart in FIG. 7 described previously premises that "Play×Time Code" is selected as the arrangement mode from the beginning of the key frame setting work. However, it is possible to similarly apply the above-described control contents also to a case where the key frame setting work is performed in another arrangement mode at first and the arrangement mode is switched to "Play×Time Code" on the way. FIG. 14 shows an example of the key frame list obtained by performing the key frame setting work under "Time Code". It can be seen that a total of ten pieces of key frame information are arranged in time code ascending order. A case where an operator who has completed the key frame setting work so far changes the arrangement mode to "Play×Time Code" and then performs rearrangement to obtain a desired order will be as follows. Here, it is assumed that the operator desires to arrange the key frames at No. 1, No. 5, No. 7, and No. 9 in forward playback, next, arrange the key frames at No. 3, No. 6, and No. 8 in reverse playback, and lastly, arrange the key frames at No. 2, No. 4, No. 7, and No. 10 in forward playback. In this case, first, the operator selects the key frame information on No. 1, No. 5, No. 7, and No. 9 and sets the editing area and following this, selects the editing area as the current editing area and sets the playback direction to forward playback. Following this, the operator selects the key frame information on No. 3, No. 6, and No. 8 and sets the editing area and following this, selects the editing area as the current editing area and sets the playback direction to reverse playback. Then, the operator selects the key frame information on No. 2, No. 4, No. 7, and No. 10 and sets the editing area and following this, selects the editing area as the current editing area and sets the playback direction to forward playback. By performing the operation such as this, as shown in FIG. 15, a desired key frame list is obtained.

According to the present embodiment, the key frame information on the key frames that are set sequentially by an operator are arranged appropriately in accordance with the playback direction in a target video clip. Due to this, it is possible to reduce the work load of the operator.

Other Embodiments

Embodiment(s) of the present disclosure can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is made possible to easily perform the setting of virtual viewpoint information relating to playback of a virtual viewpoint image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-168524, filed Oct. 5, 2020 which is hereby incorporated by reference wherein in its entirety.

What is claimed is:

1. An information processing apparatus comprising:
   a processor; and
   a memory including instructions stored thereon, when, when executed by the processor, cause the information processing apparatus to:
   generate a key frame in which parameters representing a position of a virtual viewpoint and an orientation of the virtual viewpoint are associated with time in a period during which image capturing is performed by a plurality of imaging devices, the virtual viewpoint being determined based on a user operation for designating the virtual viewpoint relating to a virtual viewpoint image generated based on a plurality of captured images obtained by image capturing performed by the plurality of imaging devices;
   set a playback direction of a plurality of key frames;
   generate a list in which key frame information capable of identifying each of a plurality of key frames is arranged based on a playback direction set;
   generate virtual viewpoint information representing transition of the virtual viewpoint based on the list; and
   determine, in a case where key frame information corresponding to another key frame with which the same time as that associated with a key frame is associated is arranged in the list, arrangement of key frame information corresponding to the key frame in the list based on the key frame and the parameters associated with the other key frame.

2. The information processing apparatus according to claim 1, wherein the instructions, when executed by the processor, further cause the information processing apparatus according to:
   perform, in a case where a plurality of playback directions different for the plurality of key frames is set, arrangement of a plurality of pieces of the key frame information for each of the plurality of playback directions.

3. The information processing apparatus according to claim 1, wherein the instructions, when executed by the processor, further cause the information processing apparatus according to:
   arrange key frame information corresponding to a key frame generated so that time associated with the key frame is in ascending order in a case where a playback direction set is forward playback; and
   arrange key frame information corresponding to a key frame generated so that time associated with the key frame is in descending order in a case where a playback direction set is reverse playback.

4. The information processing apparatus according to claim 1, wherein the instructions, when executed by the processor, further cause the information processing apparatus according to:
   arrange a plurality of pieces of key frame information corresponding to a plurality of key frames further based on the parameters associated with the plurality of key frames generated.

5. The information processing apparatus according to claim 1, wherein the instructions, when executed by the processor, further cause the information processing apparatus according to:
   arrange, in a case where key frame information corresponding to another key frame with which the same time as that associated with a key frame is associated is arranged in the list, key frame information corresponding to a key frame whose timing of generation is earlier at a higher position.

6. The information processing apparatus according to claim 1, wherein the instructions, when executed by the processor, further cause the information processing apparatus according to:
   generate a virtual viewpoint image based on virtual viewpoint information.

7. An information processing apparatus comprising:
   a processor; and
   a memory including instructions stored thereon, when, when executed by the processor, cause the information processing apparatus to:
   generate a key frame in which parameters representing a position of a virtual viewpoint and an orientation of the virtual viewpoint are associated with time in a period during which image capturing is performed by a plurality of imaging devices, the virtual viewpoint being determined based on a user operation for designating the virtual viewpoint relating to a virtual viewpoint image generated based on a plurality of captured images obtained by image capturing performed by the plurality of imaging devices;
   set a playback direction of a plurality of key frames;
   generate a list in which key frame information capable of identifying each of a plurality of key frames is arranged based on a playback direction set; and
   generate virtual viewpoint information representing transition of the virtual viewpoint based on the list;
   wherein key frame information is arranged corresponding to a key frame so that the key frame information is adjacent to key frame information among a plurality of pieces of key frame information in the list, which corresponds to a virtual viewpoint closer to a position of a virtual viewpoint specified by parameters associated with the key frame.

8. An information processing apparatus comprising:
a processor; and
a memory including instructions stored thereon, when, when executed by the processor, cause the information processing apparatus to:
generate a key frame in which parameters representing a position of a virtual viewpoint and an orientation of the virtual viewpoint are associated with time in a period during which image capturing is performed by a plurality of imaging devices, the virtual viewpoint being determined based on a user operation for designating the virtual viewpoint relating to a virtual viewpoint image generated based on a plurality of captured images obtained by image capturing performed by the plurality of imaging devices;
set a playback direction of a plurality of key frames generated;
generate a list in which key frame information capable of identifying each of a plurality of key frames is arranged based on a playback direction set; and
generate virtual viewpoint information representing transition of the virtual viewpoint based on the list;
wherein key frame information is arranged corresponding to a key frame so that the key frame information is adjacent to key frame information among a plurality of pieces of key frame information in the list, which corresponds to a virtual viewpoint closer to an orientation of a virtual viewpoint specified by parameters associated with the key frame.

9. A control method comprising the steps of:
generating a key frame in which parameters representing a position of a virtual viewpoint and a direction from the virtual viewpoint are associated with time in a period during which image capturing is performed by a plurality of imaging devices, the virtual viewpoint being determined based on a user operation for designating the virtual viewpoint relating to a virtual viewpoint image generated based on a plurality of captured images obtained by image capturing performed by the plurality of imaging devices;
determining a playback direction of a plurality of key frames generated at the generation step;
generating a list in which key frame information capable of identifying each of a plurality of key frames is arranged based on a playback direction set;
generating virtual viewpoint information representing transition of the virtual viewpoint based on the list; and
determining, in a case where key frame information corresponding to another key frame with which the same time as that associated with a key frame is associated is arranged in the list, arrangement of key frame information corresponding to the key frame in the list based on the key frame and the parameters associated with the other key frame.

10. A non-transitory computer readable storage medium storing a program for causing a computer to perform a control method comprising the steps of:
generating a key frame in which parameters representing a position of a virtual viewpoint and an orientation of the virtual viewpoint are associated with time in a period during which image capturing is performed by a plurality of imaging devices, the virtual viewpoint being determined based on a user operation for designating the virtual viewpoint relating to a virtual viewpoint image generated based on a plurality of captured images obtained by image capturing performed by the plurality of imaging devices;
determining a playback direction of a plurality of key frames generated at the generation step;
generating a list in which key frame information capable of identifying each of a plurality of key frames is arranged based on a playback direction set;
generating virtual viewpoint information representing transition of the virtual viewpoint based on the list; and
determining, in a case where key frame information corresponding to another key frame with which the same time as that associated with a key frame is associated is arranged in the list, arrangement of key frame information corresponding to the key frame in the list based on the key frame and the parameters associated with the other key frame.

* * * * *